United States Patent
Lin et al.

(10) Patent No.: US 8,125,465 B2
(45) Date of Patent: Feb. 28, 2012

(54) IMAGE DISPLAYING SYSTEMS

(75) Inventors: Wei-Cheng Lin, Hsinchu (TW); Ting-Kuo Chang, Hsinchu (TW)

(73) Assignee: Chimei Innolux Corporation, Chu-Nan (TW)

( * ) Notice: Subject to any disclaimer, the term of this patent is extended or adjusted under 35 U.S.C. 154(b) by 744 days.

(21) Appl. No.: 12/286,797

(22) Filed: Oct. 1, 2008

(65) Prior Publication Data

US 2009/0102814 A1    Apr. 23, 2009

Related U.S. Application Data

(60) Provisional application No. 60/981,148, filed on Oct. 19, 2007.

(30) Foreign Application Priority Data

Mar. 25, 2008   (TW) ............................... 97110530 A

(51) Int. Cl.
*G06F 3/041* (2006.01)
*G06F 3/046* (2006.01)
(52) U.S. Cl. ..................... 345/174; 178/18.07
(58) Field of Classification Search .................. 345/204, 345/173, 87, 143, 139, 113, 104, 211, 174, 345/182, 678, 179; 349/12, 141, 138, 114, 349/187, 42; 341/33; 178/18.02, 18.03, 178/18.04, 18.05, 18.06, 18.08, 18.09, 19.01, 178/19.02, 19.03, 19.04, 19.05, 19.06, 20.04, 178/18.01, 18.07
See application file for complete search history.

(56) References Cited

U.S. PATENT DOCUMENTS

| | | | |
|---|---|---|---|
| 4,550,221 A | 10/1985 | Mabusth | |
| 4,733,222 A * | 3/1988 | Evans | 341/33 |
| 5,008,497 A | 4/1991 | Asher | |
| 5,914,465 A | 6/1999 | Allen et al. | |
| 7,009,663 B2 * | 3/2006 | Abileah et al. | 349/12 |
| 7,671,833 B2 * | 3/2010 | Lee et al. | 345/104 |
| 7,773,068 B2 * | 8/2010 | Nakamura et al. | 345/104 |
| 2006/0097991 A1 | 5/2006 | Hotelling et al. | |
| 2006/0114247 A1 * | 6/2006 | Brown | 345/204 |
| 2007/0040814 A1 * | 2/2007 | Lee et al. | 345/173 |
| 2007/0152984 A1 | 7/2007 | Ording et al. | |
| 2007/0285365 A1 * | 12/2007 | Lee | 345/87 |
| 2008/0048995 A1 * | 2/2008 | Abileah et al. | 345/173 |

* cited by examiner

*Primary Examiner* — Nabil Z Hindi
(74) *Attorney, Agent, or Firm* — Liu & Liu

(57) ABSTRACT

An image displaying system is provided, in which a touch panel comprises a transparent substrate with a first surface and a second surface opposite to the first surface, a black matrix, a protection layer, at least one first transparent electrode, a planarization layer, a color filter and a common electrode. The black matrix is disposed on the second surface to define at least one transparent region. The protection layer is disposed on the black matrix and the transparent region, and the first transparent electrode is disposed on the protection layer and within the transparent region, wherein the first transparent electrode, the transparent substrate and an external electrode form a touch sensing capacitor. The planarization layer is disposed on the protection layer and the first transparent electrode, the color filter is disposed on the planarization layer, and the common electrode is disposed on the planarization layer and covering the color filter.

20 Claims, 11 Drawing Sheets

IMAGE DISPLAYING SYSTEMS

This application claims the benefit of U.S. Provisional Application No. 60/981,148 filed on Oct. 19, 2007, and this application also claims priority of Taiwan Patent Application No. 097110530, filed on Mar. 25, 2008, the entirety of which is incorporated by reference herein.

BACKGROUND OF THE INVENTION

1. Field of the Invention

The invention relates to image displaying systems, and more particularly, to an image displaying systems with a touch panel.

2. Description of the Related Art

Today, there exist many types of input devices to perform computer operations. The operations generally correspond to moving a cursor and/or making selections on a display screen. For example, the input devices may include buttons or keys, a mouse, trackballs, touch pads, joy sticks, touch screens and the like. Touch screens, in particular, are becoming increasingly popular because of their ease of use and operational versatility, as well as increasing affordability. Touch screens allow a user to make selections and move a cursor by simply touching the display screen via a finger or stylus. In general, the touch screen recognizes being touched and the position of the touched area on the display screen and the computer system interprets the touch and thereafter performs an action based on the touched event.

Touch screens typically include a touch panel, a controller and a software driver. The touch panel is a clear panel with a touch sensitive surface. The touch panel is positioned in front of a display screen so that the touch sensitive surface covers the viewable area of the display screen. The touch panel registers touch events and sends these signals to the controller. The controller processes the signals and sends the data to the computer system. Next, the software driver translates the touched events into computer events.

However, by mounting a touch panel to the front of a display panel to implement touch screen functions, thickness and volume of the touch screen is increased.

BRIEF SUMMARY OF THE INVENTION

Embodiments of an image displaying system are provided, in which a touch panel comprises a transparent substrate, a black matrix, a protection layer, at least one first transparent electrode, a planarization layer, a color filter and a common electrode. The transparent substrate comprises a first surface and a second surface opposite to the first surface, and the black matrix is disposed on the second surface of the transparent substrate to define at least one transparent region. The protection layer is disposed on the black matrix and the transparent region, and the first transparent electrode is disposed on the protection layer and within the transparent region, wherein the first transparent electrode, the transparent substrate and an external electrode form a first touch sensing capacitor. The planarization layer is disposed on the protection layer and the first transparent electrode, a color filter is disposed on the planarization layer, and a common electrode is disposed on the planarization layer and covering the color filter.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

Figure 1A:
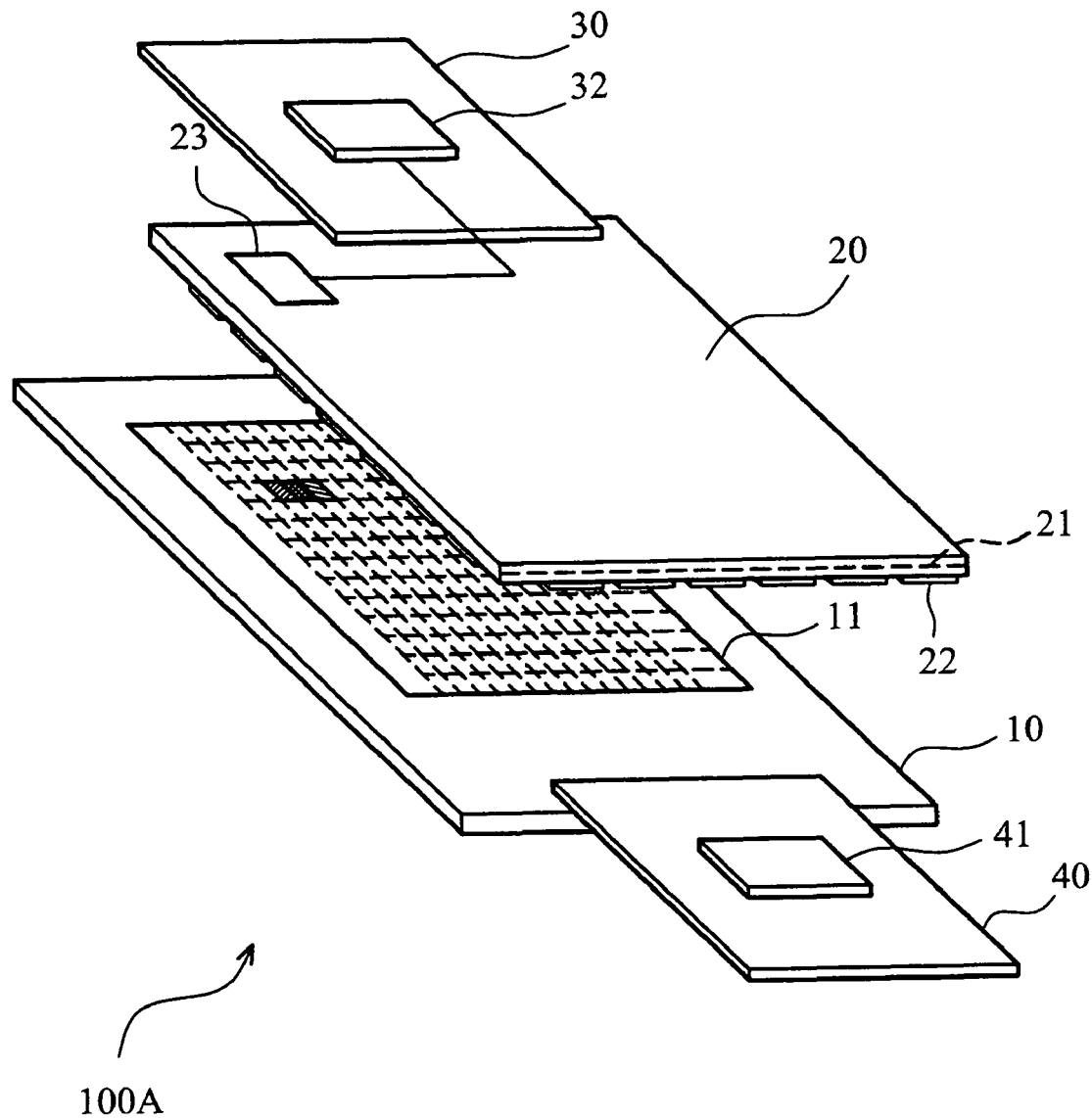
FIG. 1A shows an embodiment of a display panel.

The following description is of the best-contemplated mode of carrying out the invention. This description is made for the purpose of illustrating the general principles of the invention and should not be taken in a limiting sense. The scope of the invention is best determined by reference to the appended claims.

In embodiments of the invention, the touch panel is integrated into the upper substrate of the display panel, such that thickness, volume and cost of entire touch screen can be decreased. FIG. 1 shows an embodiment of a display panel according to the invention. As shown, the display panel 100A comprises an array substrate 10, a touch panel 20, and circuit boards 30 and 40. The array substrate 10 comprises a pixel array 11 with a plurality of data lines, a plurality of scan lines and a plurality of pixel elements, but is not limited thereto. The circuit board 40 is coupled to the array substrate 10 and comprises a first controller 41 to drive the array substrate 10 according to data from a host (not shown). The touch panel 20 comprises a plurality of induction electrodes 21 formed on a substrate, a plurality of color filters 22 formed on the substrate and a touch sensing circuit 23, in which the touch sensing circuit 23 comprises a plurality of transferring elements to transfer capacitance variations sensed by the induction electrodes to corresponding voltage values. The circuit board 30 is coupled to the touch panel 20 and comprises a second controller 32 to output a corresponding signal to the host according to the voltage values generated by the touch sensing circuit 23.

Figure 1B:
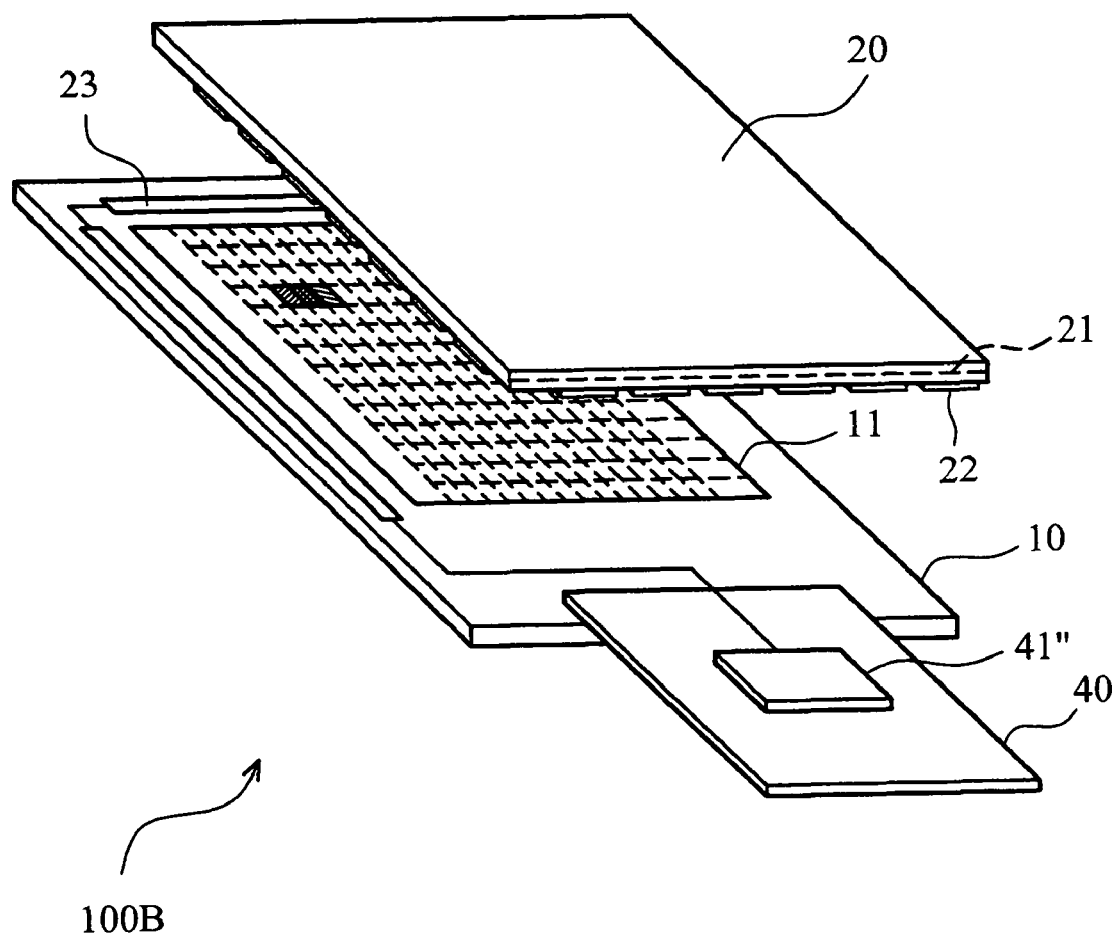
FIG. 1B shows another embodiment of the display panel.

FIG. 1B shows another embodiment of the display panel. As shown, the display panel 100B is similar to that shown in FIG. 1A, wherein the only differences are that the circuit board 30 is integrated into the circuit board 40 and the touch sensing circuit 23" on the touch panel 20 is integrated into the array substrate 10. In this embodiment, the first controller 41" on the circuit board 40 not only drives the array substrate 10 according to data from the host (not shown) but also outputs a corresponding signal to the host according to the voltage values generated by the touch sensing circuit 23".

Figure 2A:
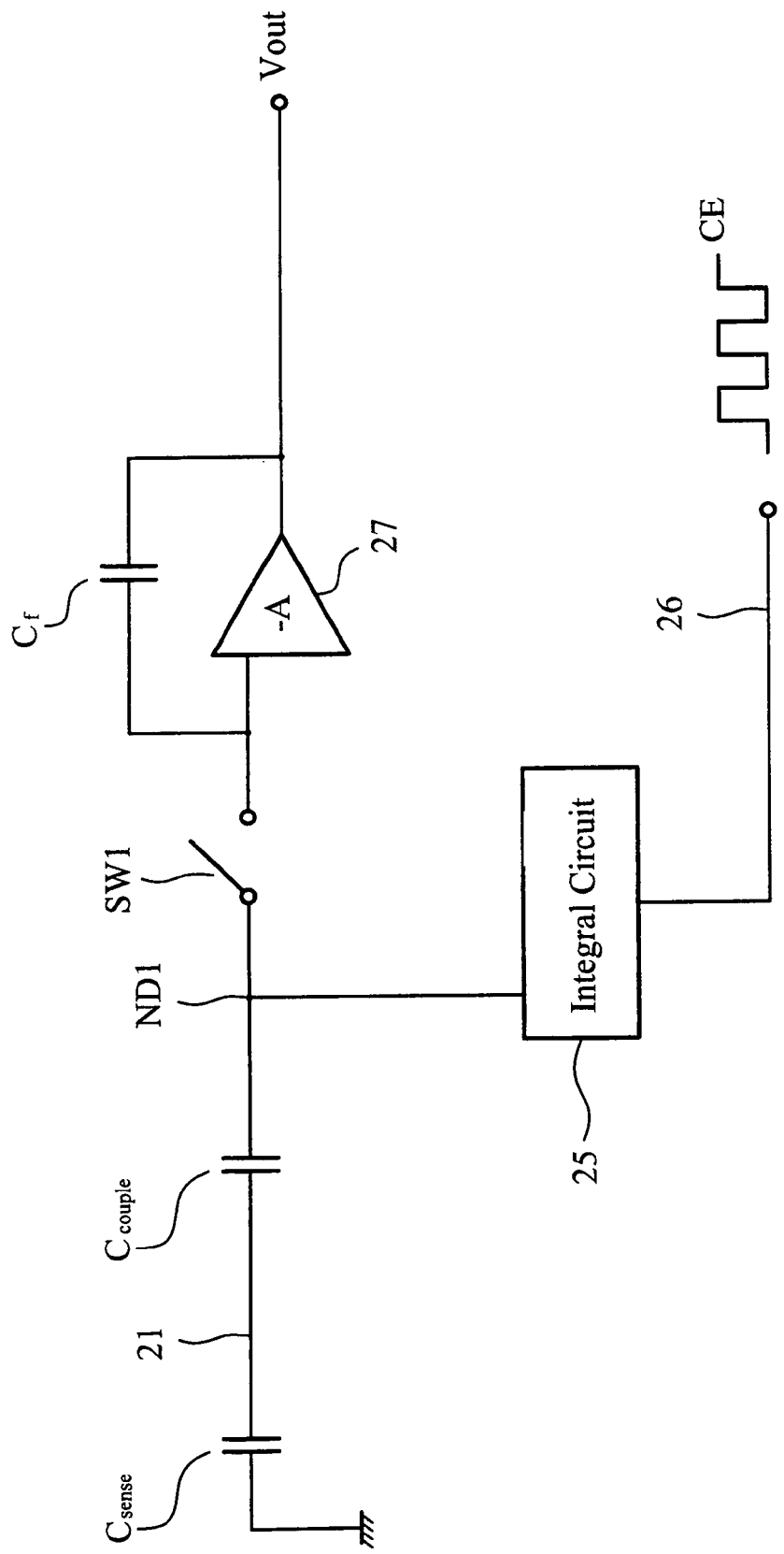
FIG. 2A shows an embodiment of a transferring unit in a touch sensing circuit.
Figure 2B:
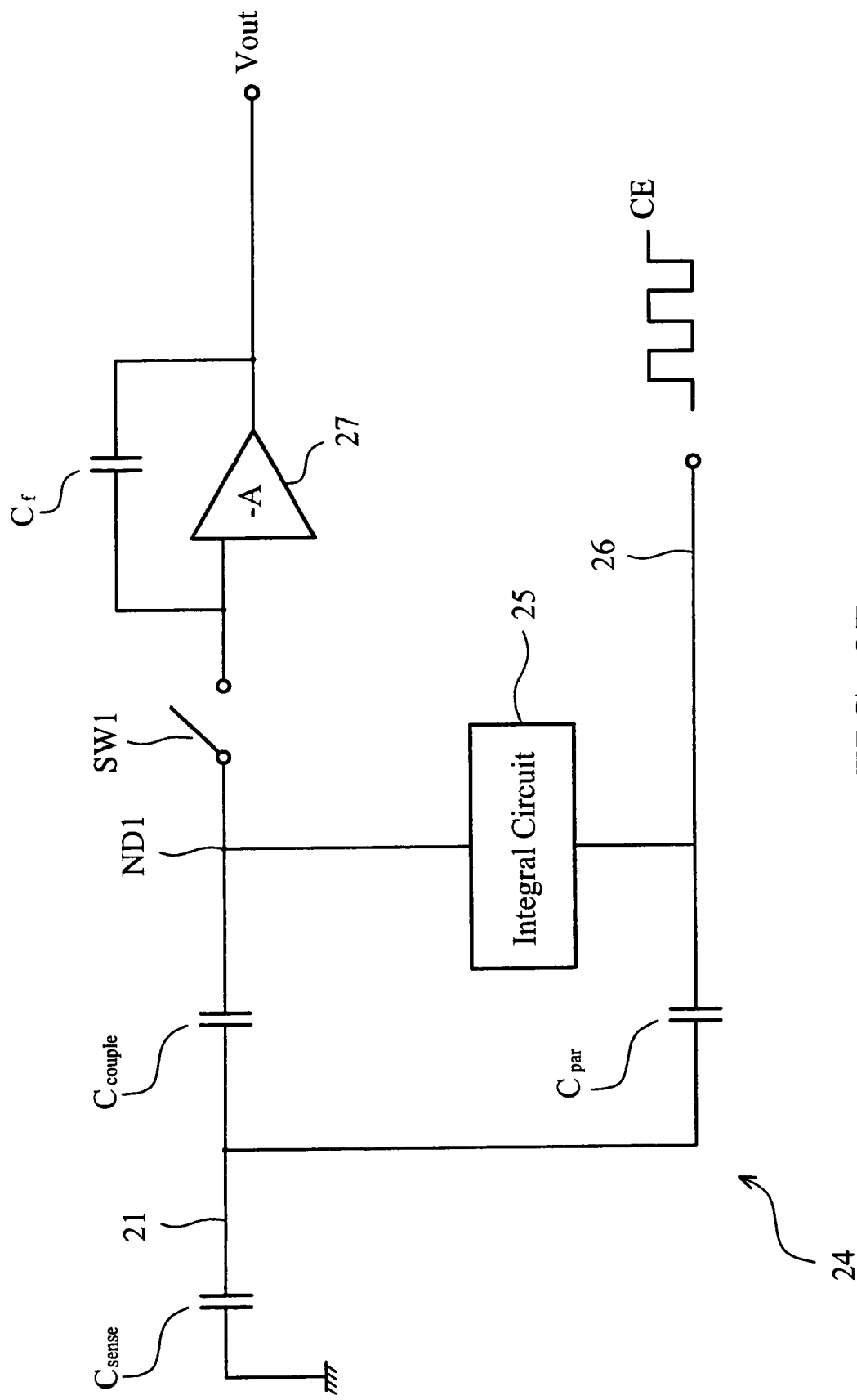
FIG. 2B shows another embodiment of the transferring unit in the touch sensing circuit.

FIG. 2A shows an embodiment of a transferring element in the touch sensing circuit 23. As shown, the transferring element 24 comprises an integral circuit 25, a common electrode 26, an alternative current (AC) driving signal CE, an amplifier 27, a switching element SW1 and a capacitor $C_f$. The transferring element 24 is coupled to an induction electrode 21 (i.e., one electrode of the capacitor $C_{sense}$) on the touch panel 20 shown in FIG. 1A or 1B by a coupling capacitor $C_{couple}$. When a finger of a user or a stylus contacts the touch panel 21, the finger or the stylus and transparent electrode and the induction electrode on the touch panel 20 form the capacitor $C_{sense}$. Namely, when the finger or the stylus contacts the touch panel 20, the total capacitance of the capacitors $C_{couple}$ and $C_{sense}$ is increased, such that a voltage difference is induced on a node ND1. The integral circuit 25 accumulates the voltage difference on the node ND1, and the switching element SW1 outputs the accumulated voltage difference from the integral circuit 25 to the amplifier 27 at every predetermined time interval. The amplifier 27 and the capacitor $C_f$ amplify the accumulated voltage difference from the integral circuit 25 to serve as an output voltage output to the second controller 32 on the circuit board 30 or the first controller 41" on the circuit board 40. In some embodiments, the capacitor $C_{couple}$ can be omitted. Further, more practically, a parasitical capacitor exists between the capacitor $C_{sense}$ and $C_{couple}$ and the common electrode 26 as shown in FIG. 2B.

Figure 3:
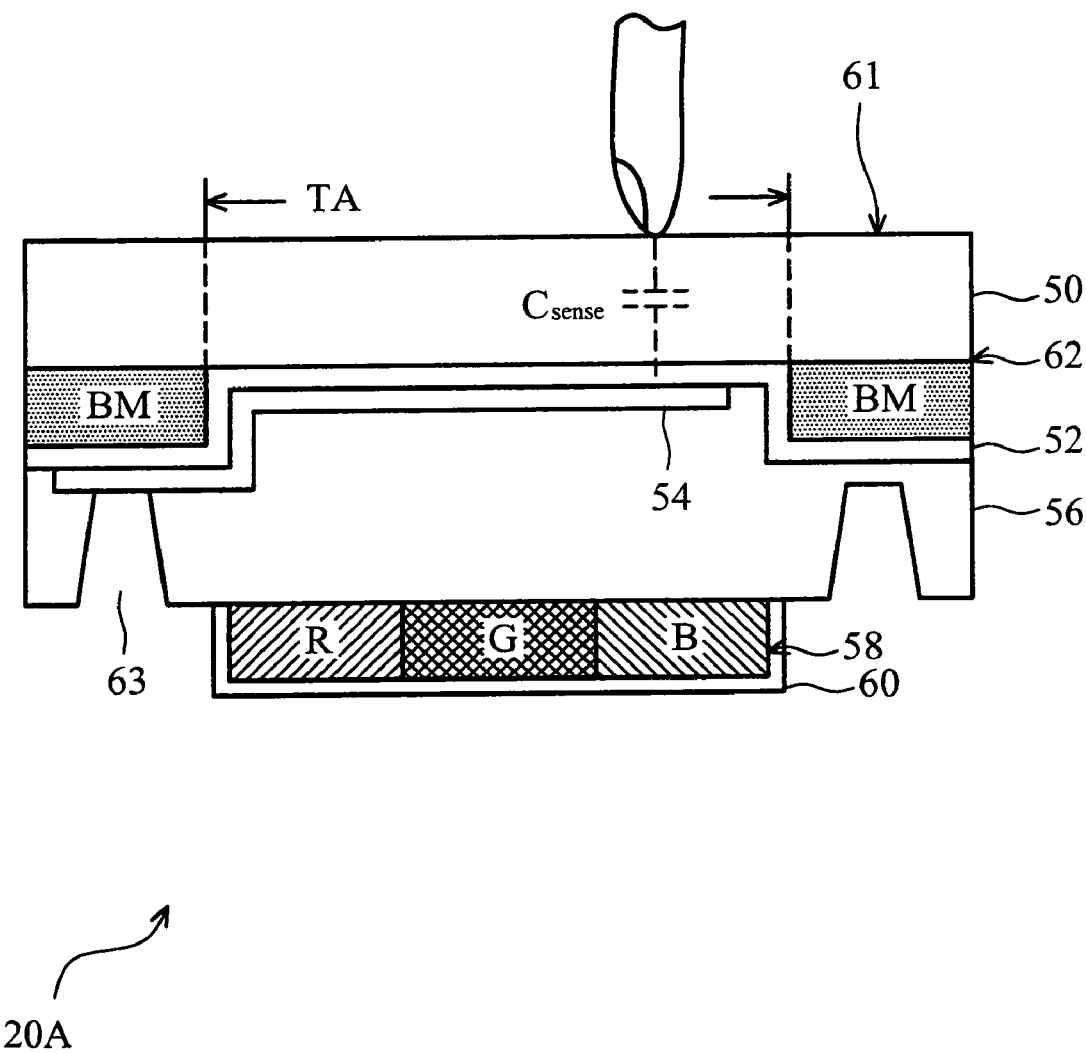
FIG. 3 shows an embodiment of a touch panel.

FIG. 3 shows an embodiment of a touch panel according to the invention. Here, in order to simplify the drawings, only a portion of the entire touch panel 20A is shown. The touch panel 20A comprises a transparent substrate 50, a black matrix BM, a protection layer 52, an induction electrode 54, a planarization layer 56, a color filter 58, and a common electrode 60. The transparent substrate 56 can be a glass substrate, and the transparent substrate 50 has a first surface 61 and a second surface 62 opposite to the first surface 61. The black matrix BM is disposed on the second surface 62 of the transparent substrate 50 to define at least one transparent region TA on the transparent substrate 50. The protection layer 52 is formed on the black matrix BM and the transparent area TA, and the induction electrode 54 is disposed on the protection layer 52 and the black matrix BM. For example, the induction electrode 54 is extended to the top of the black matrix BM from the transparent area TA. The transparent area TA, the induction electrode 54 and an external electrode (i.e., the finger or the stylus) form the capacitor $C_{sense}$. For example, the induction electrode 54 is transparent, such as ITO, but is not limited thereto. The planarization layer 56 is disposed on the protection layer 52 and the induction electrode 54, and has an opening 63 to expose a portion of the induction electrode 54. The color filter 58 is disposed on the planarization layer 56 and aligned to the transparent area TA, and comprises a red region, a green region and a blue region. The common electrode 60 is disposed on the planarization layer 56, covers the color filter 58, and is electrically coupled to the AC driving signal CE (as shown in FIGS. 2A and 2B).

Figure 4A:
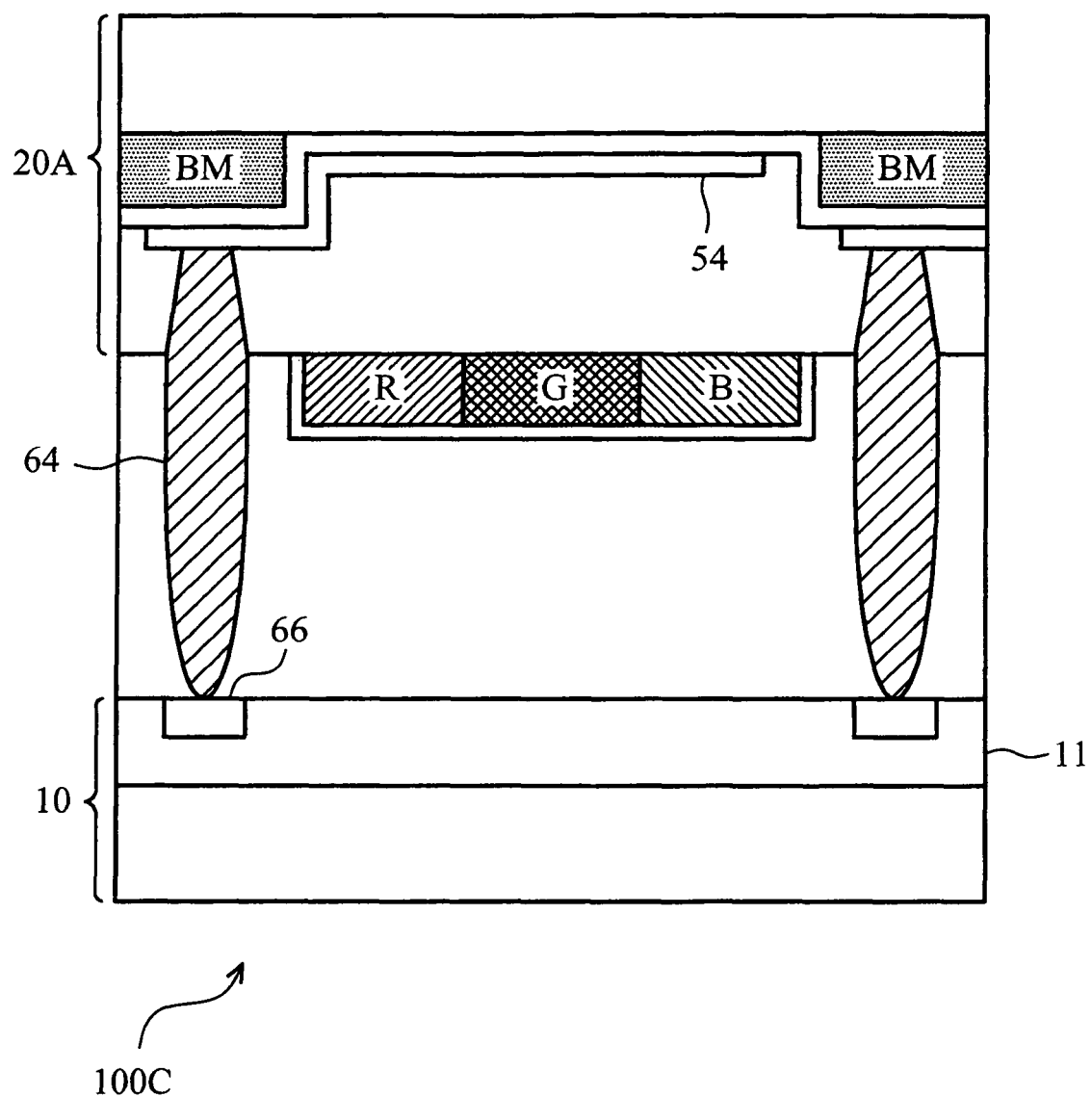
FIG. 4A shows another embodiment of the display panel.

FIG. 4A shows another embodiment of the display panel. As shown, the induction electrode 54 of the touch panel 20A is electrically connected to a conductive layer 66 on the array substrate 10 by a metal ball 64, such as an Au ball. Namely, the touch panel 20A can be implemented as the embodiment shown in FIG. 1B, to transfer capacitance variations on the induction electrode 54 to the integral circuit 25 in the touch sensing circuit 23" by the metal ball 64 and the conductive layer 66. For this situation, the capacitor $C_{couple}$ can be omitted.

Figure 4B:
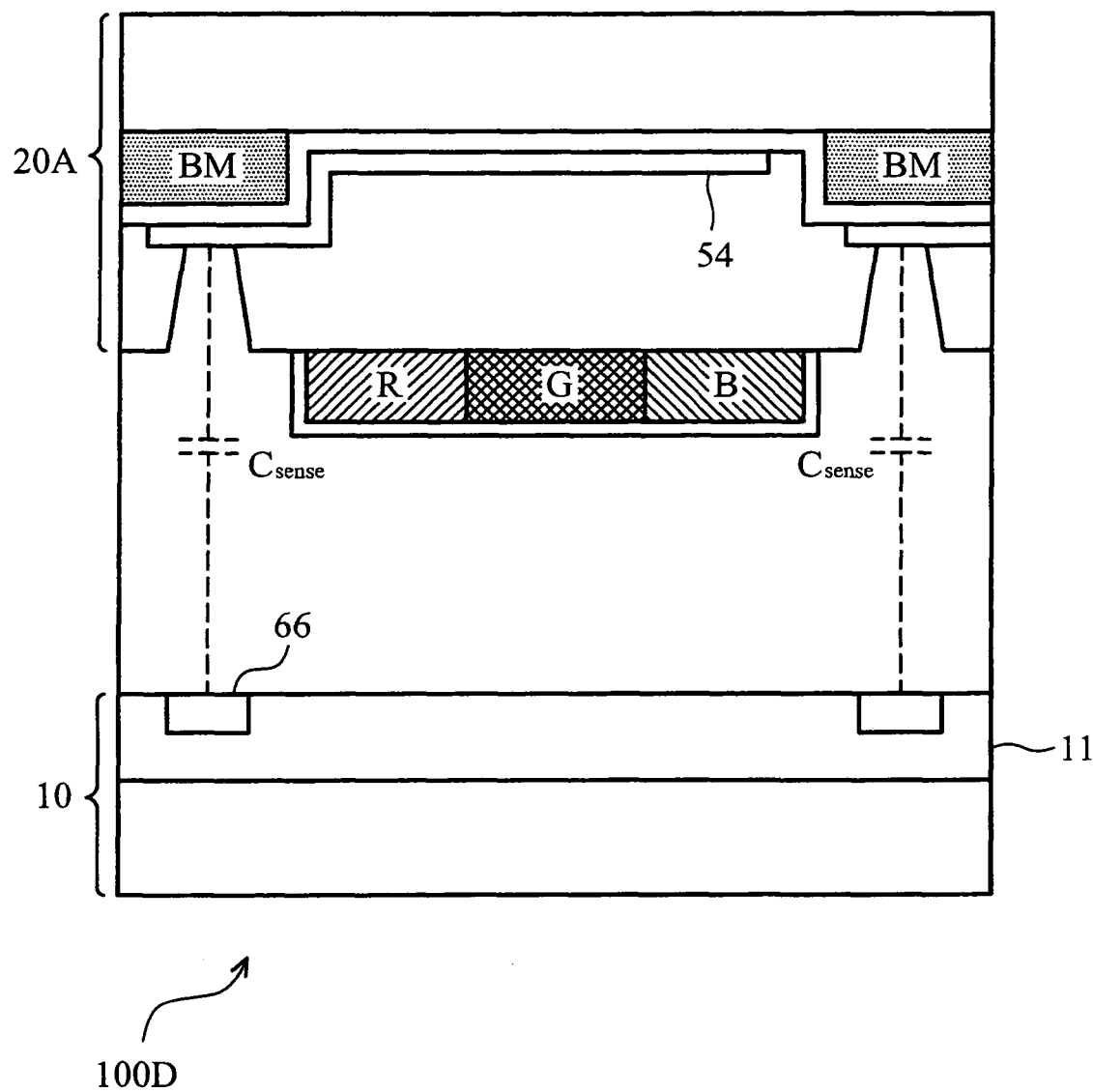
FIG. 4B shows another embodiment of the display panel.

FIG. 4B shows another embodiment of the display panel. As shown, the touch panel 20A is similar to that shown in FIG. 4A, wherein the only difference is that the induction electrode 54 is coupled to the conductive layer 66 by air rather than the metal ball 64, in which the conductive layer 66 is connected to the integral circuit 25 of the touch sensing circuit 23" on the array substrate 10. In this situation, the induction electrode 54, the conductive layer 66 on the array substrate 10 and air therebetween form the capacitor $C_{couple}$.

Figure 5:
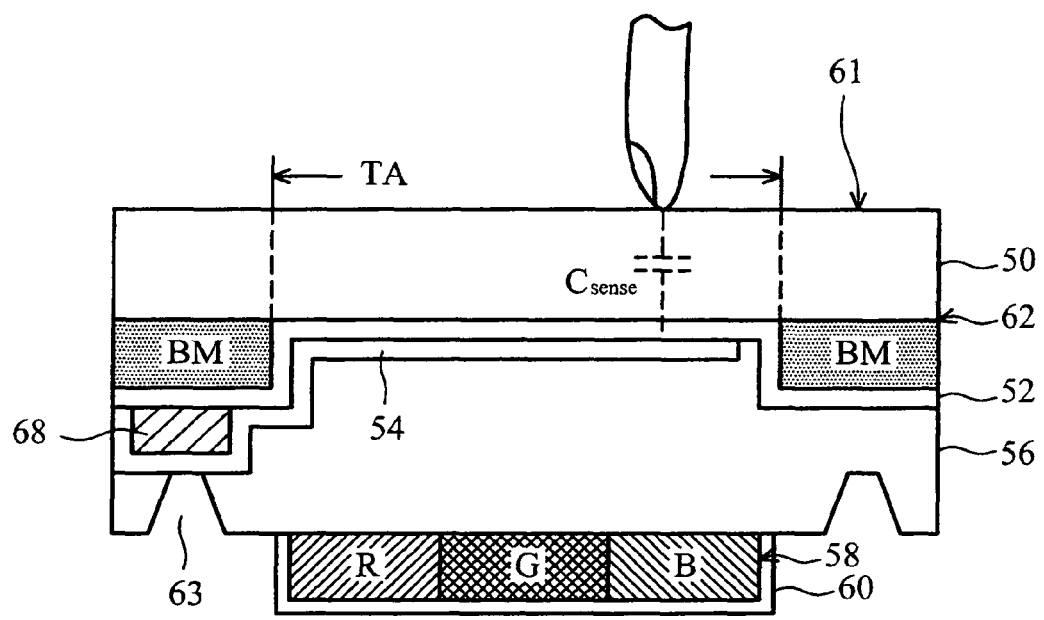
FIG. 5 shows another embodiment of the touch panel.

FIG. 5 shows another embodiment of the touch panel according to the invention. As shown, the touch panel 20B is similar to the touch panel 20A shown in FIG. 3, wherein the only difference is that a conductive layer 68 is disposed between the black matrix BM and the induction electrode 54. The induction electrode 54 can be coupled to the integral circuit 25 of the touch sensing circuit 23 by the conductive layer 68. When the touch sensing circuit 23 is disposed on the touch panel 20 as shown in FIG. 1A, capacitance variations on the induction electrode 54 can be coupled to the integral circuit 25 of the touch sensing circuit 23 in the touch panel 20. On the contrary, when the touch sensing circuit 23" is disposed on the array substrate 10 as shown in FIG. 1B, the touch panel 20B can also be coupled to the array substrate 10 by air or metal balls thereby transferring capacitance variations on the induction electrode 54 to the integral circuit 25 of the touch sensing circuit 23" by air or metal balls.

Figure 6:
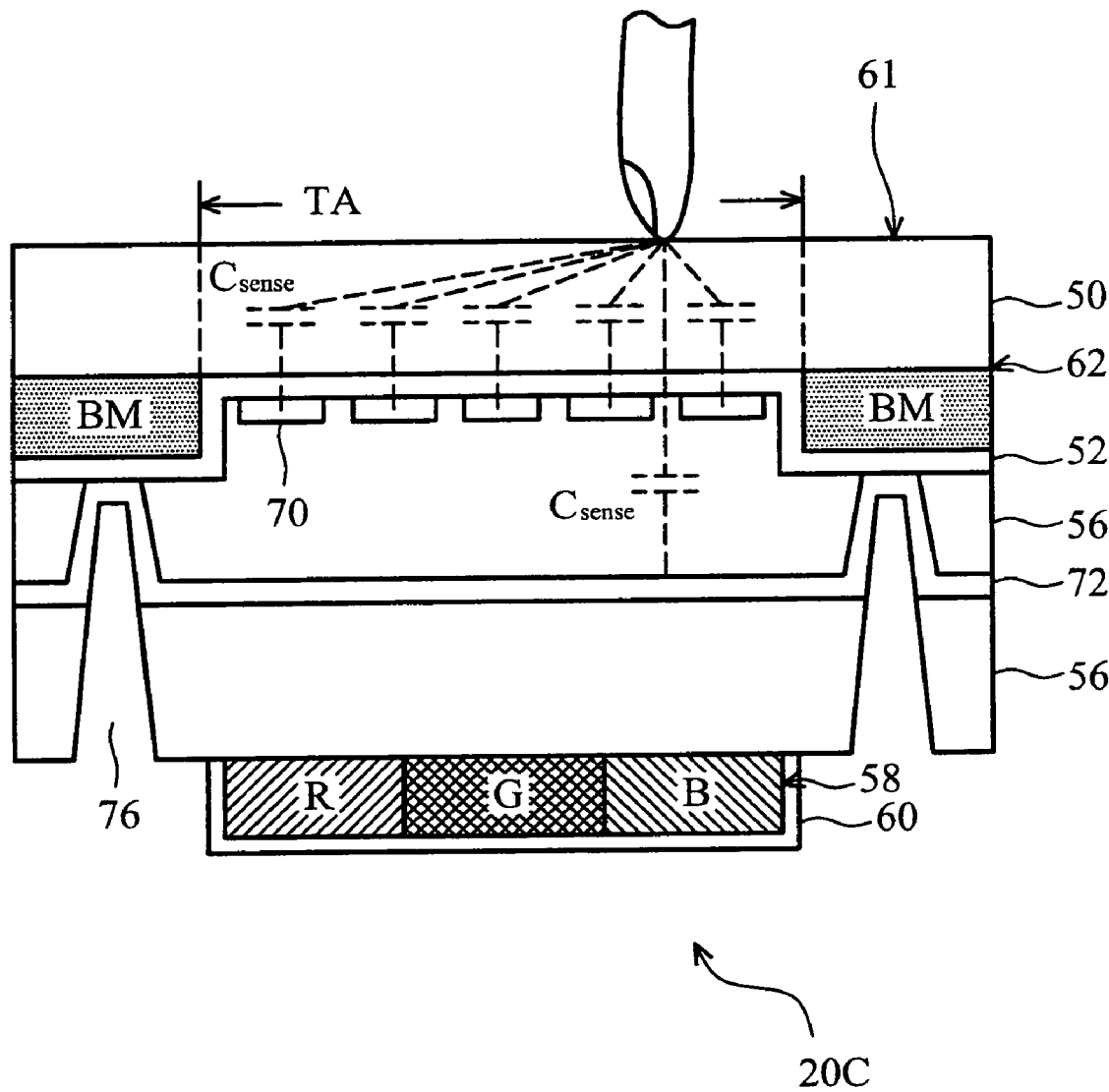
FIG. 6 shows another embodiment of the touch panel.

FIG. 6 shows another embodiment of the touch panel according to the invention. As shown, the touch panel 20C is a multi-touch type touch panel. The touch panel 20C is similar to that shown in FIG. 3, wherein the only difference is that the induction electrode 54 is replaced with a plurality of induction electrodes 70 on the protection layer 52. The induction electrodes 70 are disposed within the transparent region TA and extended along a first direction (i.e., the direction toward the center of the paper), and each induction electrode 70, the transparent substrate 50 and the external electrode (i.e., finger or stylus) form a capacitor $C_{sense}$. At least one induction electrode 72 is disposed in the planarization layer 56, and extended along a second direction (i.e., the direction which is parallel to the paper), and the induction electrode 72, the transparent substrate 50 and the external electrode (i.e., finger or stylus) also form a capacitor $C_{sense}$. For example, the first direction is perpendicular to the second direction. In addition, the planarization layer 56 has an opening 76 to expose a portion of the induction electrode 72. In this embodiment, the induction electrodes 70 and 72 in the touch panel 20C can be coupled to the array substrate 10 by metal balls or air. In the embodiment shown in FIG. 1B, the touch sensing circuit 23" is disposed on the array substrate 10, the touch panel 20C can also be electrically coupled to the array substrate 10 by metal balls or air thereby transferring capacitance variations on the induction electrode 70 and 72 to the integral circuit 25 of the touch sensing circuit 23" by air or metal balls.

Figure 7:
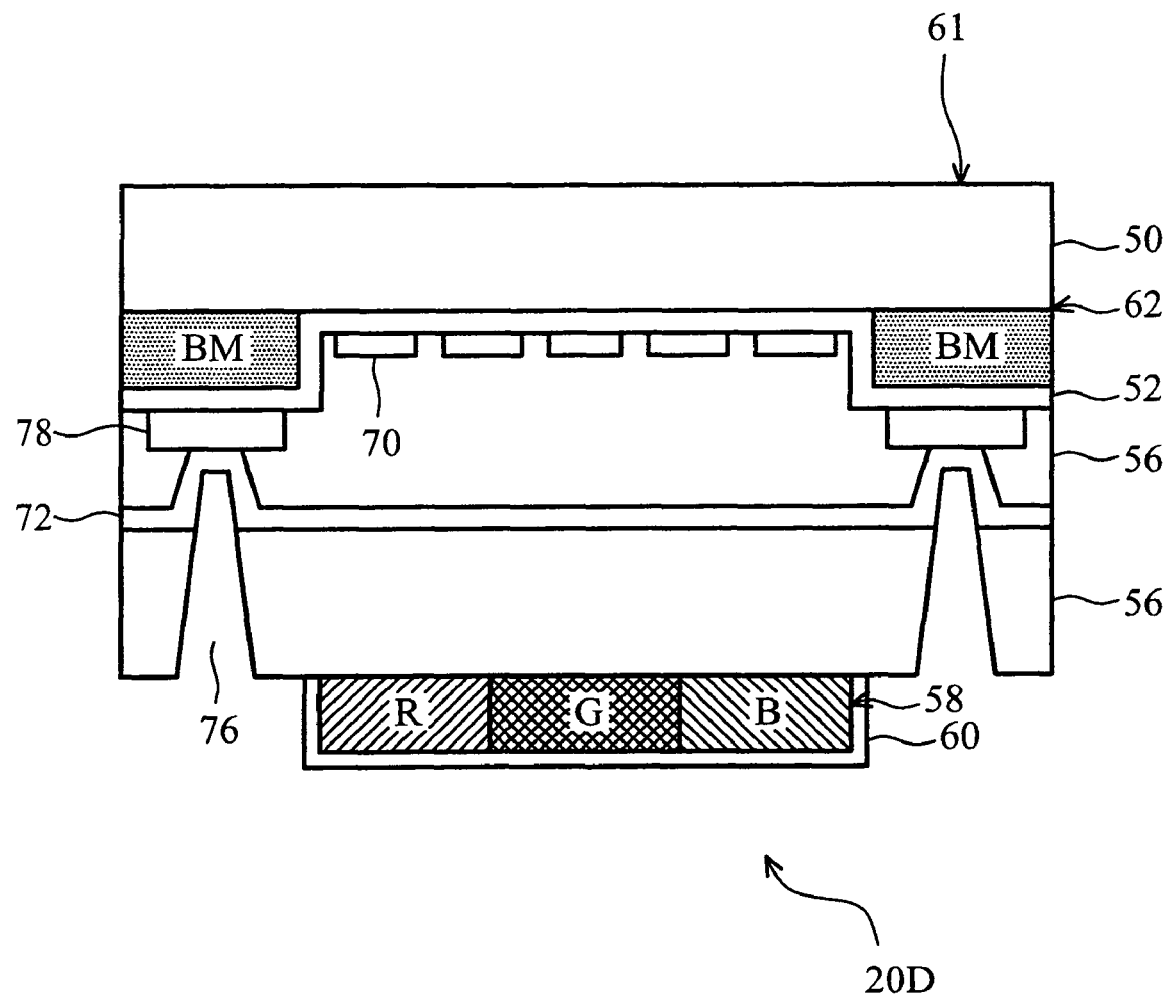
FIG. 7 shows another embodiment of the touch panel.

FIG. 7 shows another embodiment of the touch panel according to the invention. As shown, the touch panel 20D is similar to that shown in FIG. 6, wherein the only difference is that a conductive layer 78 is disposed between the black matrix BM and the induction electrode 72. For example, when the touch panel 20D is applied to the embodiment shown in FIG. 1A, capacitance variations on the induction electrode 72 can be coupled to the integral circuit 25 of the touch sensing circuit 23 on the touch panel 20D by the conductive layer 78. Similarly, the capacitance variations on the induction electrode 70 can be coupled to the integral circuit 25 of the touch sensing circuit 23 on the touch panel 20D by another conductive layer (not shown) disposed between the black matrix BM and the induction electrode 70. On the contrary, when the touch panel 20D is applied to the embodiment shown in FIG. 1B, the touch panel 20D can be coupled to conductive layers (i.e., the conductive layer 66 shown in FIG. 4A) by metal balls or air, thereby transferring capacitance variations on the induction electrode 70 and 72 to the integral circuit 25 of the touch sensing circuit 23" by air or metal balls.

Figure 8:
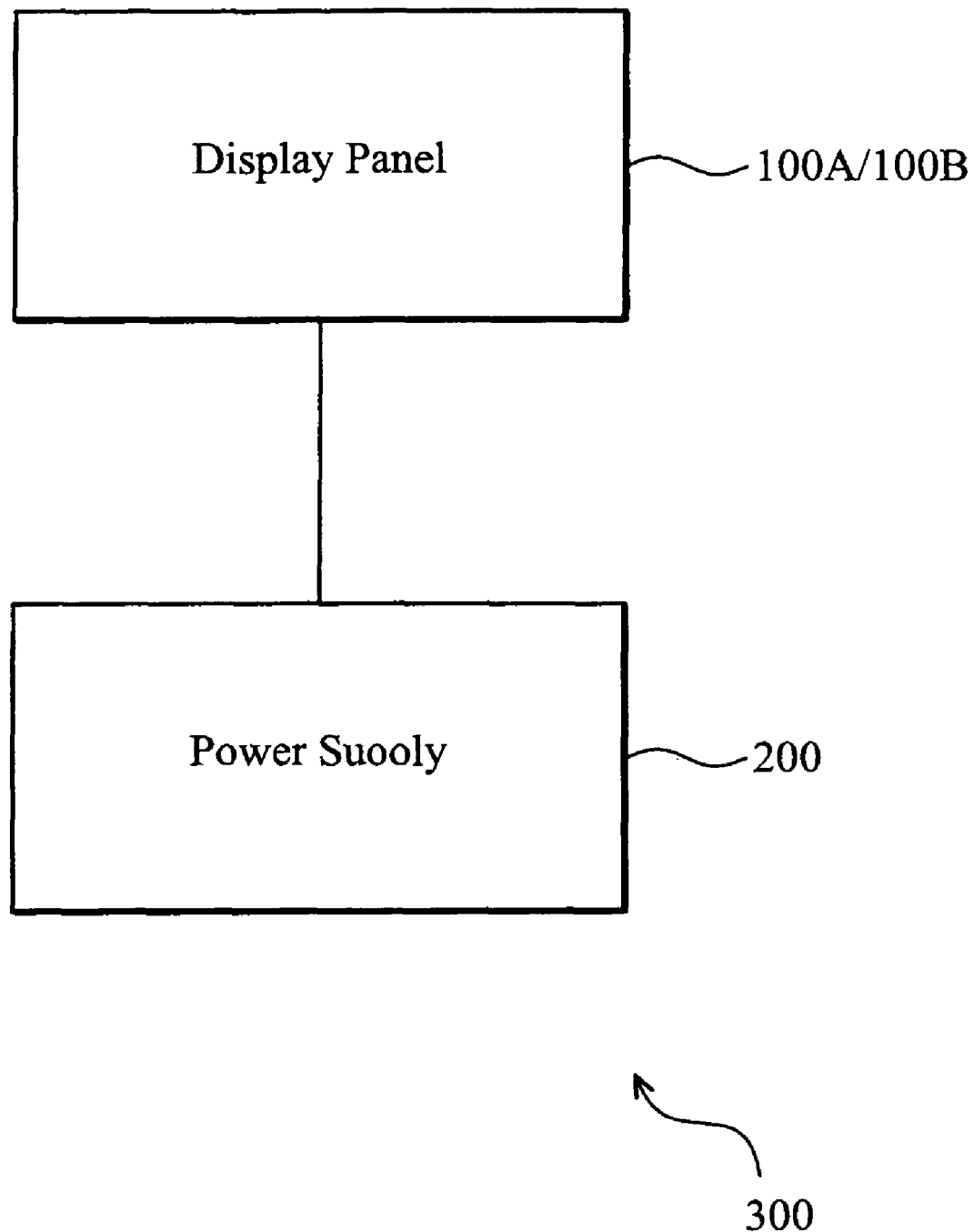
FIG. 8 shows an embodiment of an electronic system.

FIG. 8 shows an embodiment of an image displaying system according to the invention, in which the image displaying system can be implemented as an electronic device. As shown, the image displaying system 300 comprises the display panel 100A/100B and a power supply 200. Although the image display system 300 comprises numerous elements, the other elements are not shown for simplification. Operationally, the power supply 200 powers the display panel 100A/

100B, thereby displaying images. For example, the image displaying system 300 can be implemented as a notebook computer, a mobile phone, a digital camera, a personal digital assistant, a desktop computer, a television, a car display, a global positioning system (GPS), an aviation display or a portable digital versatile disc (DVD) player, but are not limited thereto.

Certain terms are used throughout the descriptions and claims to refer to particular system components. As one skilled in the art will appreciate, consumer electronic equipment manufacturers may refer to a component by different names. This document does not intend to distinguish between components that differ in name but not function.

Although the invention has been described in terms of preferred embodiment, it is not limited thereto. Those skilled in the art can make various alterations and modifications without departing from the scope and spirit of the invention. Therefore, the scope of the invention shall be defined and protected by the following claims and their equivalents.

What is claimed is:

1. An image displaying system, comprising:
    a touch panel comprising:
        a transparent substrate comprising a first surface and a second surface opposite to the first surface,
        a black matrix disposed on the second surface of the transparent substrate to define at least one transparent region;
        a protection layer disposed on the black matrix and the transparent region;
        at least one first transparent electrode disposed on the protection layer and within the transparent region, wherein the first transparent electrode, the transparent substrate and an external electrode form a first touch sensing capacitor;
        a planarization layer disposed on the protection layer and the first transparent electrode;
        a color filter disposed on the planarization layer; and
        a common electrode disposed on the planarization layer and covering the color filter.

2. The image displaying system as claimed in claim 1, wherein the color filter is aligned to the transparent region and comprises a red region, a green region and a blue region.

3. The image displaying system as claimed in claim 2, wherein the first transparent electrode is disposed on the transparent region and the black matrix.

4. The image displaying system as claimed in claim 3, further comprises an array substrate disposed opposite the touch panel, wherein the array substrate comprises a plurality of data lines, a plurality of scan lines, a plurality of pixel elements and a touch sensing circuit.

5. The image displaying system as claimed in claim 4, wherein the planarization layer has at least one opening to expose a portion of the first transparent electrode, and the exposed first transparent electrode is electrically coupled to the touch sensing circuit on the array substrate.

6. The image displaying system as claimed in claim 5, wherein the exposed first transparent electrode is electrically coupled to the touch sensing circuit on the array substrate by at a metal ball or air.

7. The image displaying system as claimed in claim 4, further comprising a display panel comprising:
    the touch panel;
    the array substrate; and
    a controller coupled to the array substrate to control the pixel elements, such that the display panel displays images and provides a touch function according to data sensed by the touch sensing circuit.

8. The image displaying system as claimed in claim 7, wherein the image displaying system comprises an electronic device, and the electronic device comprises the display panel.

9. The image displaying system as claimed in claim 1, wherein the electronic device comprises a notebook computer, a mobile phone, a digital camera, a personal digital assistant, a desktop computer, a television, a car display, a global positioning system (GPS), an aviation display or a portable digital versatile disc (DVD) player.

10. The image displaying system as claimed in claim 3, further comprising:
    a touch sensing circuit disposed on the transparent substrate; and
    an array substrate comprising a plurality of data lines, a plurality of scan lines and a plurality of pixel elements.

11. The image displaying system as claimed in claim 10, wherein the touch panel further comprises a conductive layer disposed between the black matrix and the first transparent electrode to electrically connect the first transparent electrode to the touch sensing circuit of the transparent substrate.

12. The image displaying system as claimed in claim 11, further comprising a display panel comprising:
    the touch panel disposed opposite the array panel;
    a first controller disposed on a first circuit board and coupled to the array substrate to control the pixel elements such that the display panel displays images; and
    a second controller disposed on a second circuit board and coupled to the touch sensing circuit of the transparent substrate to provide a touch function.

13. The image displaying system as claimed in claim 1, wherein the first transparent electrode, the transparent substrate and an external electrode form a first touch sensing capacitor, and the first transparent electrode is extended along a first direction, and the touch panel further comprises:
    at least one second transparent electrode disposed in the planarization layer, wherein the second transparent electrode is extended along a second direction intersecting the first direction, and the second transparent electrode, the transparent substrate and the external electrode form a second touch sensing capacitor.

14. The image displaying system as claimed in claim 13, wherein the first direction is perpendicular to the second direction.

15. The image displaying system as claimed in claim 13, wherein the touch panel further comprises a plurality of conductive layers disposed between the black matrix and the first transparent electrode and between the black matrix and the second transparent electrode, to electrically connect the first and second transparent electrodes to a touch sensing circuit on an array substrate.

16. The image displaying system as claimed in claim 13, wherein the planarization layer has at least one opening to expose a portion of the second transparent electrode, and the exposed first transparent electrode is electrically coupled to a touch sensing circuit on an array substrate.

17. The image displaying system as claimed in claim 16, wherein the exposed second transparent electrode is electrically connected to the touch sensing circuit on the array substrate by a metal ball.

18. A touch sensing circuit, disposed in a touch panel, comprising:
    an integral circuit coupled to an induction electrode to accumulate voltage differences caused by capacitance variations on the induction electrode according to an alternative current driving signal;
    an amplifier amplifying the accumulated voltage difference from the integral circuit; and a switching element coupled between the integral circuit and the amplifier to control transferring the accumulated voltage difference from the integral circuit to the amplifier.

19. The touch sensing circuit as claimed in claim 18, further comprising a coupling capacitor coupled between the induction electrode and the integral circuit.

20. The touch sensing circuit as claimed in claim 19, wherein the switching element is coupled in series between the integral circuit and the amplifier to control transferring the accumulated voltage difference from the integral circuit to the amplifier.

* * * * *